Feb. 19, 1963 W. GLAMANN 3,077,730
DRIVING ARRANGEMENT FOR A SUPERCHARGED
INTERNAL COMBUSTION ENGINE
Filed July 23, 1959
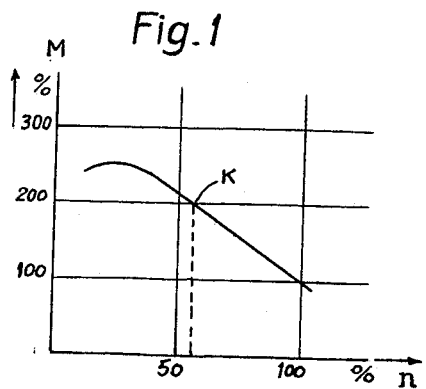
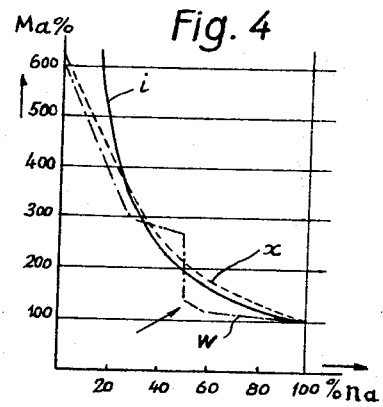
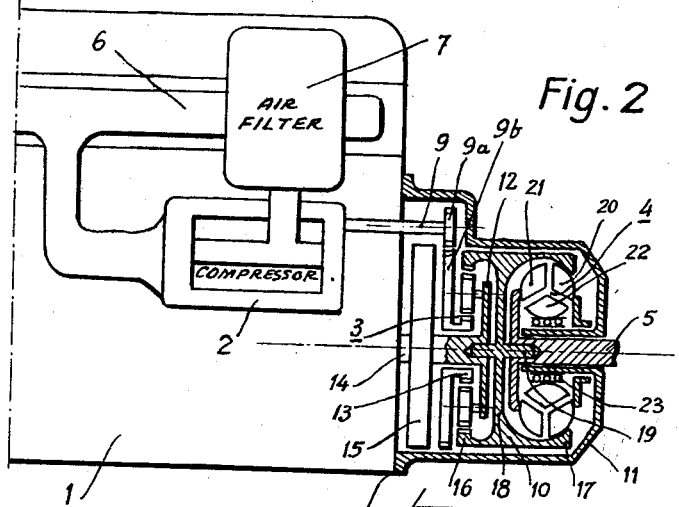
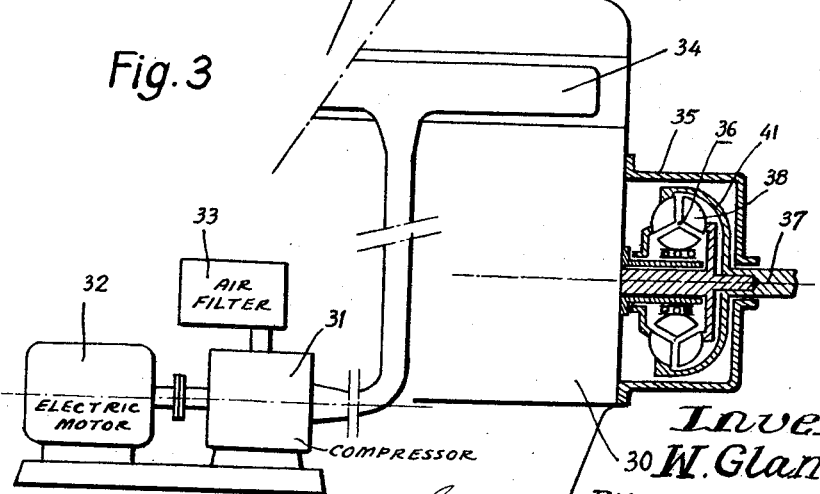
Inventor
W. Glamann
BY
Glascock Downing Seebold Attys.

United States Patent Office 3,077,730
Patented Feb. 19, 1963

3,077,730
DRIVING ARRANGEMENT FOR A SUPER-
CHARGED INTERNAL COMBUSTION EN-
GINE
Wilhelm Glamann, Kiel-Friedrichsort, Germany, assignor
to Differential-Diesel, Vaduz, Liechtenstein
Filed July 23, 1959, Ser. No. 828,975
Claims priority, application Germany July 28, 1958
3 Claims. (Cl. 60—12)

The present invention relates to a drive unit comprising an internal combustion engine preferably supercharged by means of a mechanically driven compressor and adapted to provide a driving torque curve having a hyperbolic form, that is to say sharply rising towards the low speeds of the engine. This feature is obtained by means of construction elements of standard type for this kind of drive unit.

The power transmission of internal combustion engines employed for the propulsion of vehicles is frequently effected by means of hydraulic torque converters which convert the engine torque as a function of the speed of the driven vehicle.

Transmission systems of this type normally have relatively low efficiency of transmission. But then in the case of vehicle traction, it is desirable to obtain a low rate of fuel consumption, in addition to a high starting torque. For this reason, a number of combinations of torque converters with automatic gear-boxes and mechanical or hydraulic drive-couplings, actuated automatically, have both been suggested and produced.

All these solutions are complicated and costly.

One expedient which has particularly been employed in the search for a low consumption of fuel is to cause the coupling point of the torque converter to coincide with an average speed of the engine, in such manner that in the case of high speeds of the vehicle, the transmission takes place with a high degree of efficiency, either by a hydraulic drive-coupling or by a mechanical transmission.

The disadvantage of this solution is that a hollow portion then appears in the curve of the tractive effort for certain speeds of the vehicle, this phenomenon being due to the fact that the engine no longer gives its full power at that moment. It follows as a result that a vehicle driven by a drive unit of this type slows down considerably every time the road resistance increases until such time as the drive unit has recovered the necessary tractive effort to overcome the increased resistance, at substantially lower speeds of the vehicle. This behaviour is troublesome and has given rise to serious criticism.

The present invention eliminates these drawbacks.

The invention consists in the combination of a hydraulic torque converter with an internal combustion engine supercharged preferably by means of a mechanically driven compressor and adapted to produce the coupling curve mentioned at the outset, that is to say having the form of a hyperbola, the coupling point of the torque converter being selected on the curve of the engine torque in such manner that an almost ideal tractive effort curve of hyperbolic shape is obtained without any hollow portion.

A useful and valuable additional feature of this new combination is obtained in a particular form of embodiment, by virtue of the fact that the torque converter is thus of smaller size than usual. Thus a considerable saving is made in the cost of this device, and this compensates for the cost of the special elements required to produce the rising curve of the engine torque. In the particular form of embodiment in question a reduction of the size of the converter is obtained by virtue of the fact that a planetary gear train which is located on the output shaft of the engine and is necessary to produce the ascending torque curve, provides the mechanical means for driving the compressor and acts simultaneously as a speed-multiplying device, thus producing an increase in speed and a reduction in size of the torque converter.

Another valuable feature resulting from this particular combination, in addition to the practically ideal shape of the traction curve thus obtained resides in the fact that this surve is considerably higher, that is to say, it is moved up in the direction of increased torque by virtue of the inherent features of supercharging by a compressor of the differential drive type used in this case to obtain the ascending curve of the torque.

In principle, it would also be possible to obtain a hyperbolic curve of the engine torque without the use of a planetary gear train of this type, as will later be shown in an example of construction. However, from the technical point of view, this form of embodiment is of less value, since the advantage of a reduction in the size of the converter is no longer possible, and furthermore the means of obtaining the required curve from the engine torque are in this case more complicated.

The invention will now be described below in greater detail with reference to the forms of embodiment which are shown by way of example only and not in any sense by way of limitation, and with reference to the accompanying drawings, in which:

FIGURE 1 shows an ascending curve of engine torque as a function of the speed, this curve being characteristic of the drive-unit engines of the present invention. This curve partly resembles a hyperbolic curve, since the torque rises in the direction of low engine speeds in approximately inverse ratio to the speed of the said engine.

FIGURE 2 is a view in elevation with a partial cross-section of a drive unit in accordance with the invention and comprising a planetary gear train, a mechanically driven supercharger and a hydraulic converter.

FIGURE 3 is an alternative form of embodiment without the use of a planetary gear train.

FIGURE 4 shows the tractive effort curves obtained with the drive units of FIGURES 1 and 2 as compared with the curve obtained with standard torque converter units.

In FIGURE 1, the engine torque M is shown in ordinates, as a percentage of its value at the maximum speed of the engine, while the speed of the engine N is plotted as abscissae, as a percentage of its maximum value. It can thus be seen that in the case of the drive units of the invention, as the speeds decrease, the engine torque increases in approximately inverse ratio to the speed of the engine, following a hyperbolic curve; this hyperbolic shape can extend below one-half the speed of the engine as shown.

In order that the description which follows below may be more easily understood, the precise meaning of the term "coupling point of the converter," with reference to torque converters, will be more clearly explained hereunder.

This expression refers to a speed of the input or output blades of the converter, for which the ratio of the input and output torques is approximately equal to 1. At this moment, the converter can be automatically transformed into a hydraulic drive-coupling, as in the case of the Schneider system converters. There can also be provided at this point a mechanical coupling of both the input and output blades, this coupling being then actuated either by hand or automatically, so that starting from this point, the transmission across the converter is direct.

In accordance with the present invention, a hydraulic torque converter of the type in question is combined with an internal combustion engine adapted to provide the torque curve of FIGURE 1, the "coupling point" of this converted being selected on this torque curve at a point "K," at which point the curve still rises sharply.

FIGURE 2 shows a preferred form of embodiment of a drive unit corresponding to the conditions of the present invention. In this form of embodiment, the special curve of engine torque can be obtained in known manner by the fact that the supercharging compressor 2 is coupled by means of its driving shaft 9 to a torque distributor 3 located in the casing 11. The shaft 9 is coupled by the pinions 9a and 9b to the internal planet wheel 13 of the torque distributor 3, the planet wheel carrier 12 of said torque distributor 3 being coupled to the output shaft 14 of the internal combustion engine 1.

The fly-wheel of the engine is also provided at 15, although this latter is not essential, since on the contrary this fly-wheel can be dispensed with if so required, in which case it is then replaced by the conjoint masses and inertias of the rotating parts contained in the casing 11, in particular, those of the planet-wheel carriers 12 and of the member 10. The external toothed ring 16 of the torque distributor is coupled in accordance with the invention, to an annular member 17 carrying the pump blades 20 of the torque converter 4, which also comprises in known manner, a turbine blade wheel 21 and a fixed or reaction blade unit 22. In this example, the fixed blade unit 22 is mounted on a free wheel 23 in such manner that the blade unit 22 becomes freely rotating starting from the coupling point of the converter.

It is well known that, starting from this point, the converter has the behaviour and characteristics of a hydraulic drive-coupling with a torque ratio of 1:1.

The turbine blade wheel of the converter 21 is coupled to the output, or driven shaft 5. The entire assembly is mounted in accordance with the invention, in a common casing 11 mounted with bolts on the rear end of the internal combustion engine 1.

The embracing annular member 17 of the torque converter 4 and the toothed ring 16 of the torque distributor 3 can constitute a single member 10 as shown in the drawings, but they can also be quite separate and assembled with screws or any like known means.

The assembly contained in the casing 11 has a number of the essential characteristics of the invention:

(1) The combination of a torque distributor intended to drive a supercharging compressor, an internal combustion engine and a hydraulic torque converter.

(2) The arrangement of this combination, in such manner that the torque distributor ring serves as an output element for the greater part of the power and is directly coupled to the input blades of the torque converter, constitutes a further feature of the invention. This method of construction creates a demultiplication of the driving torque between the engine and the converter in such manner that the input torque of the converter is smaller than the output torque of the engine, while on the other hand the speed of the pump wheel 20 of the converter is greater than the output speed of the engine.

In this manner the torque distributor has the simultaneous function of an overdrive for the torque converter. By means of this arrangement, both the cost price and the size of the torque converter can be reduced.

(3) The construction in the form of a single annular member 10 having a cylindrical shape, carrying the ring 16 of the torque distributor and the support 17 of the pump-wheel 20 of the torque converter, also constitutes a feature of the present invention. This form of embodiment provides a means of constituting a rigid unit which is capable of withstanding high centrifugal force, so that if necessary, the fly-wheel of the engine can be dispensed with.

On the other hand, the shell shape of the member 10 also serves to reduce the centrifugal force to its minimum value, if so desired. The member 10 is centered by means of a thin web 18 located approximately in the central portion and by means of the axial shaft-ends 19 mounted freely at the extremities of the shafts 5 and 14.

The bending stresses which could possibly be produced by the centrifugal forces of the ring 16 on the one hand and of the pump casing 17 on the other hand are balanced round the chosen assembly unit and cancel each other, at least partly.

FIGURE 2 also shows a form of embodiment of the internal combustion engine 1 itself. The casing 11 containing the torque converter 4 and the torque distributor 3 is fixed, for example by bolts, to the rear end of the engine as shown. The shaft 9 extending from the torque distributor is coupled to the supercharging compressor 2 which is mounted on the side of the engine 1. The supercharging compressor could also be located, however, on the frame 11 of the converter and distributor. This compressor sucks in air through an air filter 7 and delivers it under pressure into the induction manifold 6 of the engine.

FIGURE 3 shows a second example of a drive-unit with a mechanically driven supercharging compressor adapted to produce the torque curve of FIGURE 1. This alternative form has been shown mainly for the sake of the principle, since this arrangement is of less value than that of FIGURE 2. In this instance, the supercharging of the engine 30 is effected by means of a supercharging compressor 31 which is driven independently of the engine by an electric motor 32 which is so adjusted that a sufficient torque curve can be obtained corresponding to FIGURE 1. The compressor sucks in air through an air filter 33 and delivers the air as before, into the induction manifold 34 of the engine. On the rear end of the engine is bolted a casing 35 containing the torque converter 36, the output shaft of which is at 37. The assembly of the different elements of the torque converter as shown in detail, is somewhat different from that of FIGURE 2. In this case the pump element 38 is mounted on the output shaft of the engine 30 and the turbine element 40 is coupled to the output shaft by means of the shell 41.

FIGURE 4 shows a diagram of the tractive curve obtained with the drive unit in accordance with the invention. "$M_a$" is the value of the tractive effort expressed as a percentage of its value at the maximum speed of the vehicle; and "$N_a$" is the speed of the vehicle as a percentage of its maximum value.

The curve "$i$" represents the hyperbolic traction-curve which is ideal at constant power.

The curve "$w$" represents the best possible and the most economical solution making use of prior technical means, in the case of the application of a hydraulic transmission of the torque converter type. It will be noticed that there is a hollow portion at the place shown by an arrow. The curve "$x$" shows the curve of tractive effort of the drive unit in accordance with the present invention, this curve being identical to the ideal curve "$i$" along most of its length. At the same time the new drive unit produces a saving of fuel.

I claim:

1. A drive means to connect an internal combustion engine to a supercharger blower and to a driven shaft, said drive means including a torque distributor having a single input means rotatably driven by said engine, and two rotatable torque distributing means, one of which is geared to said supercharger, and a hydraulic torque converter comprising pump blades and turbine blades, the other of said torque distributing means being drivingly connected to said pump blades and said driven shaft being connected to said turbine blades whereby said driven shaft is driven, said torque converter also including reaction blades, a free wheel means in said torque converter on which said reaction blades are mounted so that said reaction blades may rotate in one direction whereby said torque converter will then operate as a simple hydraulic coupling.

2. A drive unit for providing power from an internal combustion engine to a driven shaft and to supply power for supercharging said internal combustion engine having a power output shaft, said unit comprising a planet gear carrier on said output shaft, at least one planet gear on said planet gear carrier, a sun gear and a ring gear each meshing with said planet gear to provide first and second driven members each receiving torque from said planet gear, a supercharger blower, gear means driven by said sun gear for driving said supercharger blower, a hydraulic torque converter including pump blades, reaction blades and driven blades, said pump blades being mounted for rotation with said ring gear, and a driven shaft, said driven blades being mounted on said driven shaft.

3. The device of claim 2, in which said power output shaft and said driven shaft are aligned, said panet gear carrier and said driven shaft each being provided with coaxial bearings, a stub shaft mounted for rotation in said bearings, a peripherally flanged disc carried by said stub shaft, said ring gear being carried by said disc and extending therefrom toward said engine, and said pump blades being carried by said flange of said disc on the side remote from said ring gear, said disc, flange and pump blades forming a substantial part of a casing enclosing said reaction blades and said driven blades.

References Cited in the file of this patent
UNITED STATES PATENTS

| | | |
|---|---|---|
| 2,581,152 | Spatta | Jan. 1, 1952 |
| 2,769,303 | Lucia et al. | Nov. 6, 1956 |
| 2,848,866 | Geislinger | Aug. 26, 1958 |

FOREIGN PATENTS

| | | |
|---|---|---|
| 530,762 | Great Britain | Dec. 19, 1940 |